(12) United States Patent
Agostini et al.

(10) Patent No.: US 9,154,018 B2
(45) Date of Patent: Oct. 6, 2015

(54) COOLING OF AN ELECTRIC MACHINE

(71) Applicant: ABB Research Ltd., Zurich (CH)

(72) Inventors: Bruno Agostini, Zurich (CH); Cajetan Pinto, Mumbai (IN); Christian Meckel, Rufenach (CH); Mathieu Habert, Rheinfelden (CH)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/858,543

(22) Filed: Apr. 8, 2013

(65) Prior Publication Data

US 2013/0221774 A1 Aug. 29, 2013

Related U.S. Application Data

(63) Continuation of application No. PCT/EP2010/065016, filed on Oct. 7, 2010.

(51) Int. Cl.
*H02K 9/18* (2006.01)
*H02K 9/19* (2006.01)
*H02K 9/06* (2006.01)
(Continued)

(52) U.S. Cl.
CPC .. *H02K 9/18* (2013.01); *H02K 9/06* (2013.01); *H02K 9/12* (2013.01); *H02K 9/14* (2013.01); *H02K 9/19* (2013.01); *F28D 15/0233* (2013.01); *F28D 15/0266* (2013.01); *F28D 15/0275* (2013.01)

(58) Field of Classification Search
CPC ............. H02K 9/06; H02K 9/14; H02K 9/18; H02K 9/19

USPC .................... 310/52, 54, 56–59, 64
See application file for complete search history.

(56) References Cited

U.S. PATENT DOCUMENTS 1,700,840 A * 2/1929 Gay ................................. 310/52
3,571,635 A * 3/1971 Turner ............................ 310/59
(Continued)

FOREIGN PATENT DOCUMENTS

DE 2240392 A1 3/1974
EP 1628513 A1 2/2006
(Continued)

OTHER PUBLICATIONS

International Search Report & Written Opinion of the International Searching Authority Application No. PCT/EP2010/065016 Completed: Oct. 6, 2011; Mailling Date: Oct. 19, 2011 24 pages.

*Primary Examiner* — Dang Le
(74) *Attorney, Agent, or Firm* — Whitmyer IP Group LLC

(57) ABSTRACT

An electric machine including a closed chamber with a wall and enclosing a stator, a rotor and a first fluid and a heat exchanging unit stretching from the chamber through the wall to a fluid transporting passage. The heat exchanging unit includes conduits provided in a loop, containing a working fluid and equipped with evaporator channels and condenser channels, first heat transfer elements inside the chamber for transferring heat from the first fluid to the working fluid via the evaporator channels and second heat transfer elements in the passage for transferring heat out of the working fluid via the condenser channels to a second fluid, a first fluid propagating unit inside the chamber forcing the first fluid to circulate and a second fluid propagating unit in the passage forcing the second fluid to flow past the second heat transfer element.

18 Claims, 4 Drawing Sheets

(51) Int. Cl.
*H02K 9/14* (2006.01)
*H02K 9/12* (2006.01)
*F28D 15/02* (2006.01)

(56) References Cited

U.S. PATENT DOCUMENTS

| | | | |
|---|---|---|---|
| 4,600,050 | A | 7/1986 | Noren |
| 5,844,333 | A | 12/1998 | Sheerin |
| 5,884,693 | A | 3/1999 | Austin et al. |
| 6,119,767 | A | 9/2000 | Kadota et al. |
| 6,499,532 | B1 | 12/2002 | Williams |
| 7,102,267 | B2 * | 9/2006 | Gromoll et al. |
| 8,148,858 | B2 * | 4/2012 | Hassett et al. ............ 310/52 |
| 2002/0014324 | A1 | 2/2002 | DiPaolo |
| 2005/0156470 | A1 | 7/2005 | Gromoll et al. |
| 2009/0056916 | A1 | 3/2009 | Yesin et al. |
| 2010/0033042 | A1 * | 2/2010 | Hassett et al. ............ 310/64 |

FOREIGN PATENT DOCUMENTS

| | | | | |
|---|---|---|---|---|
| EP | 2031332 | A1 | 3/2009 | |
| JP | H0974717 | A | 3/1997 | |
| JP | 2008121930 | A | 5/2008 | |
| JP | 2009038940 | A * | 2/2009 | ............ H02K 9/20 |
| JP | 2009052878 | A | 3/2009 | |
| KR | 1019980063276 | | 10/1998 | |
| WO | 9821808 | A1 | 5/1998 | |
| WO | 2004030183 | A1 | 4/2004 | |

* cited by examiner

COOLING OF AN ELECTRIC MACHINE

FIELD OF THE INVENTION

The present invention generally relates to electric machines. More particularly the present invention relates to the cooling of such electric machines.

BACKGROUND OF THE INVENTION

Electric machines, such as electric motors, can be large and bulky. The larger they get and the more energy they generate or draw the issue of cooling gets increasingly important.

High Ingress Protection index electrical motors do for instance often use a water to air heat exchanger to cool the air inside an enclosure containing the motor. This is very convenient in marine applications for example where water is readily available, but might be not possible in some other working environments or when water close to electrical components must be avoided.

It is also known to use air-to-air heat exchangers in motors. One example on this is given in U.S. Pat. No. 5,844,333, where motor air is cooled through passing coolant tubes with ambient air.

Another type of heat-exchanger that has been used is the heat-pipe. A single frame including a heat-pipe array for an electric motor is described in U.S. Pat. No. 6,499,532.

One interesting technology that exists is the thermosyphon cooling technique.

This technology is for instance used in relation to cooling of electric components, which is described in US 2002/0014324 and EP 2031332. EP 2031332 describes a very compact heat exchanging unit, which is interesting to use also in other areas.

Thermosyphon based cooling has also been previously used in relation to electric machines. US 2005/156470 does for instance describe the cooling of a stator using a thermosyphon unit.

Finally also U.S. Pat. No. 7,102,267 describes the use of thermosyphon technique in relation to an electric machine. In this document the heat exchanging elements used are however bulky.

It would therefore be of interest to improve on the cooling elements described in this latter document.

The present invention is therefore directed towards providing an electric machine being cooled using a more compact thermosyphon based heat exchanging structure.

SUMMARY OF THE INVENTION

One object of the present invention is to provide a more compact electric machine employing thermosyphon heat exchanging technology.

This object is according to the present invention obtained through an electric machine comprising:
- a closed chamber with at least one wall and enclosing a stator, a rotor and a first fluid,
- a heat exchanging unit stretching from the chamber through the wall and to a fluid transporting passage outside the chamber, the heat exchanging unit comprising
  - at least one conduit provided in a loop within the heat exchanging unit and comprising a working fluid, the conduit being provided with an evaporator channel and a condenser channel,
  - a first heat transfer element inside the chamber in contact with the evaporator channel for transferring heat from the first fluid to the working fluid in the conduit via the evaporator channel, and
  - a second heat transfer element in the fluid transporting passage in contact with the condenser channel for transferring heat out of the working fluid in the conduit via the condenser channel to a second fluid,
- a first fluid propagating unit provided inside the chamber and configured to force the first fluid in the chamber to flow past the stator, rotor and first heat transfer element, and
- a second fluid propagating unit provided in the fluid transporting passage for forcing the second fluid to flow past the second heat transfer element of the heat exchanging unit.

The present invention has a number of advantages. The thermosyphon heat exchange is performed using the heat exchange unit, which can be small and compact and thus easy to place in an electric machine. The type of cooling performed allows the cooling of a clean first fluid in the chamber using a possibly dirty second fluid, which may be an ambient fluid like air. The separation of fluid streams allows the use of a low pressure drop and a small volume. This also provides the heat exchanger design with scalability since efficiency does not depend on size. The two-phase working fluid inside the heat exchanging unit transports the heat through the heat exchanging unit by natural convection.

BRIEF DESCRIPTION OF THE DRAWINGS

The present invention will in the following be described with reference being made to the accompanying drawings, where FIG. 1 schematically shows a perspective view of a heat exchanging unit used in a an electric machine.

DETAILED DESCRIPTION OF THE INVENTION

The present invention concerns the use of a compact thermosyphon heat exchanging unit for an electric machine. The unit is a single entity or module provided within a module frame. One suitable such heat exchanging unit originally intended for semiconductor devices is described in EP 2031332, which document is herein incorporated by reference. This type of heat exchanging unit is according to the invention adapted for use in an electric machine.

Figure 1:
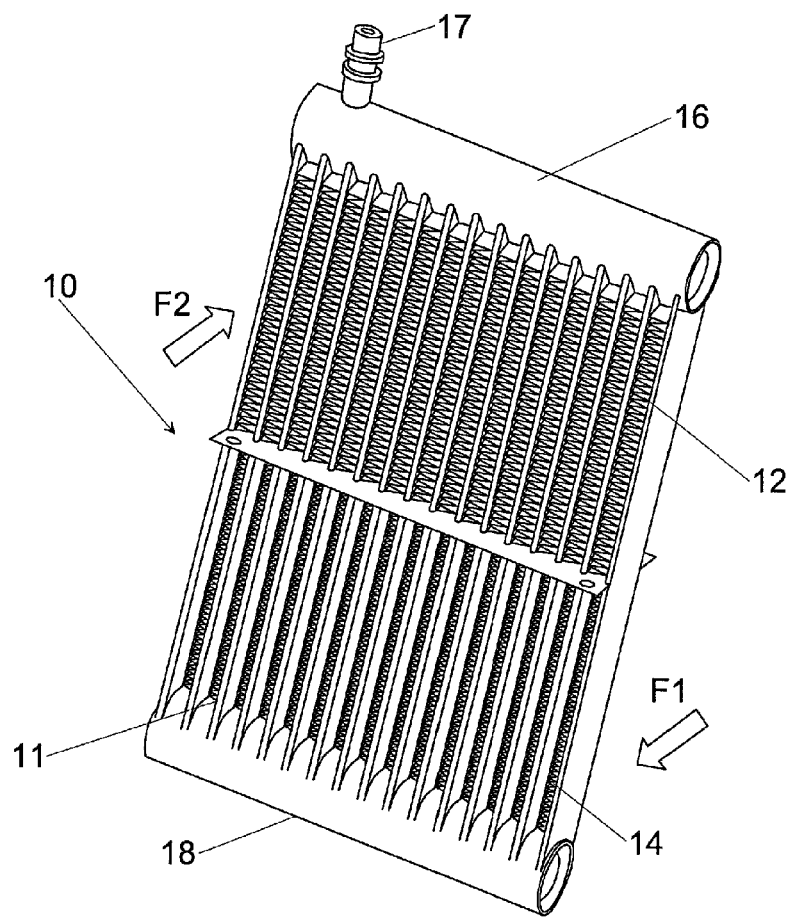

FIG. 1 shows a perspective view of a schematic heat exchanging unit being used. The unit is here made up of a single module or entity and comprises a number of parallel conduits 11 provided between an upper and a lower header tube, used as distribution manifolds 16 and 18. There is thus an upper distribution manifold 16 and a lower distribution manifold 18 and the conduits 11 are all placed vertically in parallel between these manifolds. The conduits and header tubes here form the compact unit frame. Each conduit 11 has an upper half stretching from a midpoint between the two manifolds to the upper manifold 16 and a lower half stretching from the midpoint to the lower manifold 18. The heat exchanging unit 10 also has an evaporating section formed at one side of the parallel conduits and a condensing section formed at an opposite side of the parallel conduits. In FIG. 1 the condensing section is the one shown on the upper half of the front side, while the evaporating section is only partially visible as it is located at the lower half and back side of the heat exchanging unit. The heat exchanging unit 10 also includes first and second heat transfer elements, where the first heat transfer elements 14 are provided on the lower half and on the back side in FIG. 1, while the second heat transfer elements 12 are provided on the upper half and on the front side in FIG. 1. There is also shown how a first fluid F1 flows in a first direction towards the back side of the unit. In the following, the back side of the heat exchanging unit 10 will be termed a first side, while the front side of the heat exchanging unit will be termed a second side. This first flow F1 flows towards the first heat transfer elements 14 in the evaporating section. In FIG. 1 there is also shown how a second fluid F2 flows towards the second heat transfer elements in the condensing section. It can also be seen that for these first and second flows, the conduits 11 are placed in parallel with each other at right angles to the flow of the first as well as the second fluid F1 and F2.

It can furthermore be mentioned that the heat exchanging unit also includes a discharging and charging valve 17 on the upper manifold 16. This will be described more later.

Figure 2:
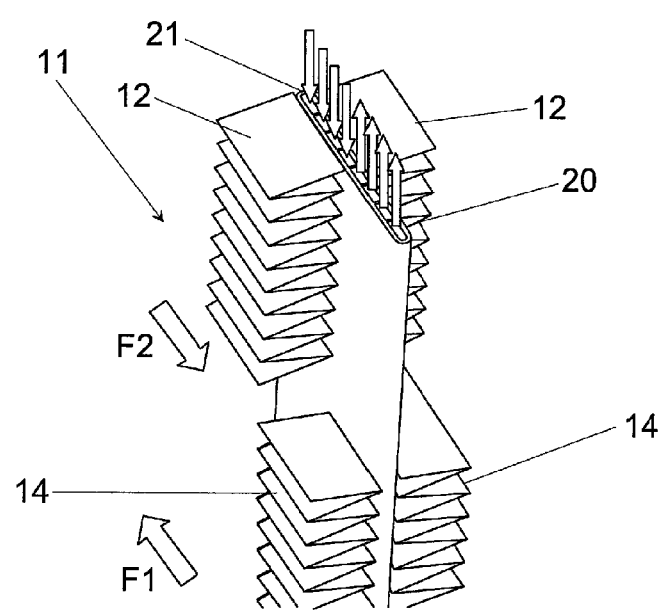
FIG. 2 schematically shows a perspective view of a conduit with heat transfer elements of such a heat exchanging unit.

FIG. 2 in turn shows a perspective view of a part of a conduit 11 in more detail. The conduit may take the form of flat multi-port extruded aluminum tube. As can be seen in this figure, a conduit 11 includes at least one evaporator channel 20 and in this example four evaporator channels and at least one condenser channel 21 and in this example four condenser channels. These channels can be provided through walls in the conduit. The channels may thus be separated through walls provided in the interior of the conduits along the direction of flow, i.e. longitudinally in the conduits. These channels are provided in parallel with each other within the conduit and furthermore at right angles to the parallel conduit placing and the evaporating and condensing sections described in relation to FIG. 1. The channels 20 and 21 are placed in parallel with each other along the flows of the first and second fluids F1 and F2. The flows of the fluids are thus made along the row of channels. The first heat transfer element 14, which is visible in FIG. 2, is also placed on opposing sides of the conduit 11 and furthermore on opposing sides of a part of the conduit where evaporator channels 20 are provided for transferring heat into the evaporator channels. The first heat transfer element 14 is naturally also in contact with the evaporator channels 20. In the same way the second heat transfer element 12 is placed on opposing sides of the conduit 11 and furthermore on opposing sides of a part of the conduit 11 where condenser channels 21 are provided for transferring heat out of the condenser channel. The second heat transfer element 14 is naturally also in contact with the condenser channels 21. The conduits are arranged in a vertical position, but other positions of at least 45 degrees are also possible. As can be understood from FIG. 2, the first heat transfer element 14 is placed in the lower half of the conduit in the evaporating section of the heat exchanging unit, while the second heat transfer element 12 is placed in the upper half of the conduit in the condensing section of the heat exchanging unit. The second heat transfer element 12 thus has a placing on the conduit 11 that is vertically above the first heat transfer element 14. The heat transfer elements are here furthermore formed as fins provided on the conduits. This is done in order to provide large contact areas with the first and second fluids.

The conduit 11 is filled with a working fluid, which may be in both a gaseous and a liquid phase. The flow of this working fluid is indicated in FIG. 2 through a number of vertical arrows in the channels 20 and 21. The heat exchanging unit 10 works with the loop thermosyphon principle. This means that in case of heat being applied to the first heat transfer element 14 through a hot first fluid F1 passing by this element 14, the working fluid in the corresponding evaporator channel 20 gets heated, changes from liquid to gaseous form and ascends within this evaporator channel 20 to the upper distribution manifold 16 and from there to the condenser channel 21, where the fluid condenses through the contact of the second heat transfer element 12 with the second fluid F2 and drops to the lower distribution manifolds 18 as a liquid.

The working fluid may be any refrigerant fluid; where some examples are R134a, R245fa, R365mfc, R600a, carbon dioxide, methanol and ammonia. The heat exchanging unit is furthermore to be mounted vertically or with a small angle from the vertical. The amount of fluid inside the heat exchanging unit may also be adjusted such that the level of liquid is just above the midpoint, i.e. above the position of the first heat transfer element. The working fluid may according to another example be water.

The fins of the first heat transfer element thus conduct heat to the part of the conduit having the evaporating section. The conduit is here exemplified by multi-port flat tubes. The evaporator channels 20 are fully or partially filled with the working fluid, depending on the amount of initial charge. The fluid in the evaporator channels 20 evaporate due to the heat and the vapour rises up in the channel by buoyancy effect. Some amount of liquid is also entrained in the vapour stream and will be pushed up in the channels.

The fins of the second heat transfer element are in turn cooled by the second fluid F2, which may be a convective airflow. The mixture of vapour and liquid inside the evaporator channels 20 reaches the top side header tube 16 and then flows down the condenser channels 21. While going through the condenser channels 21, vapour condenses back into liquid since the channels 21 are cooled by the fins. The liquid condensate flows down to the bottom header tube 18 and then back into the evaporator channels 20, closing the loop.

As with all thermosyphon-type devices, all air and other non-condensable gases inside is preferably evacuated (i.e. discharged). For this reason discharging and charging valves may be included in the heat exchanging unit. The free ends of the header-tubes are suitable locations for such valves. A single valve can also be utilized for both charging and discharging. One such valve 17 is schematically shown in FIG. 1. Alternatively, the heat exchanging unit can be evacuated, charged and permanently sealed. In this case, a valve is not necessary.

Heat transfer elements may be made of a highly thermally conductive material such as aluminum or copper. They can be manufactured using extrusion, casting, machining or a combination of such common processes.

As mentioned earlier the heat exchanging unit is to be provided for cooling an electric machine, which may be a motor or a generator. The electric machine therefore includes a stator and a rotor.

Figure 3:
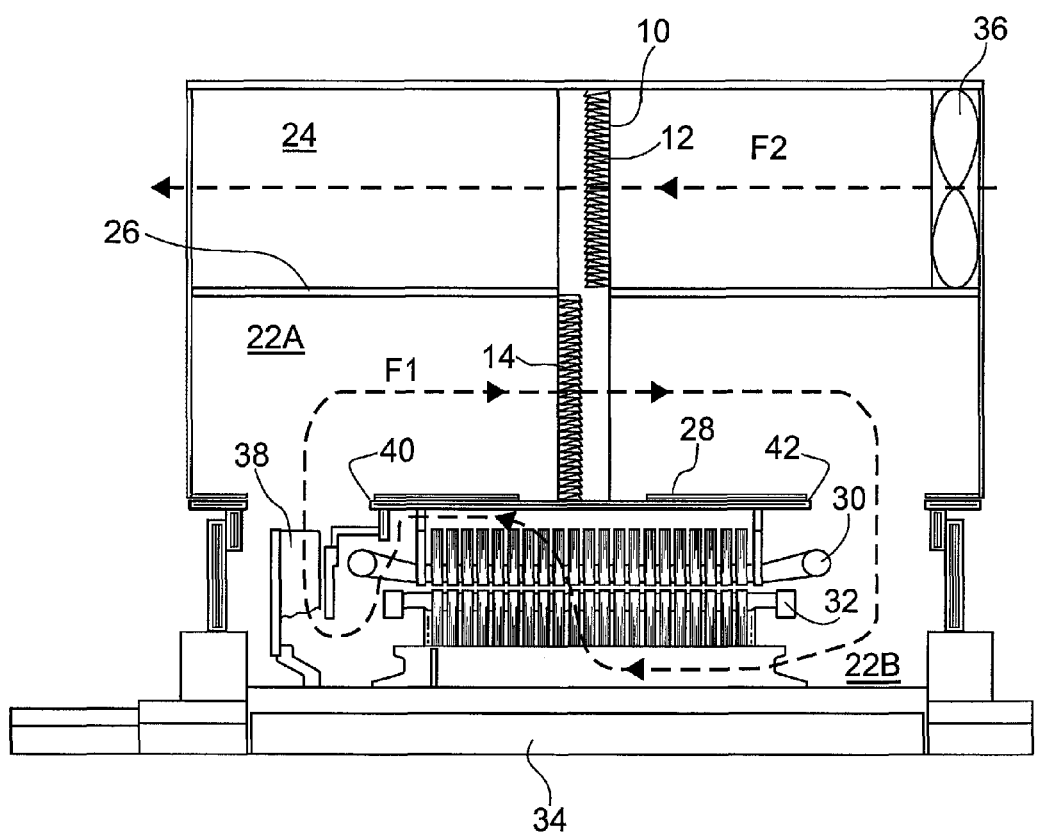
FIG. 3 shows a sectional view through a part of an electric machine according to a first embodiment of the invention.

A sectional view of such an electric machine with heat exchanging unit according to a first embodiment of the invention is schematically shown in FIG. 3.

The electric machine here includes a closed chamber 22 in which the stator 30 and the rotor 32 are provided. The chamber is here furthermore a high Ingress Protection index enclosure. In this first embodiment of the invention the chamber is also made up of a first and a second section 22A and 22B being separated by a partition 28. The partition 28 is here provided with a first opening 40 and with a second opening 42 in order to let the sections communicate with each other. These openings are vertically separated from each other. A part of the heat exchanging unit 10, in this embodiment the lower half, is provided in the first section 22A between the first and second openings, while the stator and rotor 30 and 32 are provided in the second section 22B. The first section 22A is therefore also a cooling section and the second section, in which operation of stator and rotor generate heat, is also a heat generating section. The rotor 32 is here joined with a shaft 34 and blades 38. In this way the shaft and blades form a first fluid propagating unit, here in the form of a first fan, which is mechanically joined with or coupled to the rotor. The blades 38 of the first fan are here placed in the proximity of the first opening 40 of the partition 28.

There is also a fluid transporting passage 24 provided outside of the chamber and here vertically above the chamber. This passage 24 is separated from the chamber by a wall 26, which wall is also a part of the chamber. The heat exchanging unit 10 stretches vertically from the partition separating the second section 22B from the first section 22A, through the wall 26 and into this fluid transporting passage 24. Here the upper half of the heat exchanging unit 10 is provided in the passage. In order to provide the closed chamber, the heat exchanging unit more particularly stretches through a sealed opening in the wall 26. There is finally a second fluid propagating unit, here in the form of a second fan 36, which in this embodiment is also an axial fan placed at the entrance to the passage. In other variations of the invention the fan may be a centrifugal fan.

The closed chamber includes the first fluid F1, which with advantage is air. This first fluid thus surrounds the stator and rotor 30 and 32. In the fluid transporting passage 24 the second fluid F2 is provided. This second fluid F2 is with advantage made up of ambient air being drawn into the passage 24 from outside the electric machine by the second fan 36.

As is evident from the previous description, the heat exchanging unit 10 is mounted vertically in the electric machine. This means that the bottom of this unit, which is the manifold 18, is attached to the partition 28. It is here also mounted so that the first side and also the evaporating section face the first opening 40 while the second side faces the second opening 42. The heat exchanging unit 10 is furthermore also mounted so that the second side and also the condensing section face the second fan 36. In this way the conduits are placed in parallel with each other in a direction from the first opening 40 to the second opening 42 of the partition 28. Consequently the evaporator channels and condenser channels of the conduits are provided in parallel with each other in a direction that is perpendicular to the direction from the first to the second opening.

In operation of the electric machine the rotor 32 is made to be moved by the stator 30 or movement of the rotor 32 causes a current to be generated by the stator 30. In both cases heat is generated in the chamber and more particularly in the second section 22B of the chamber. This heat is transferred to the first fluid F1, i.e. to the air in the chamber. The movement of the rotor 32 also actuates the first fan. This therefore also forces the hot air F1 in the chamber to be circulated. The first fan therefore draws the hot air F1 from the second section 22B of the chamber into the first section 22A via the first opening 40 in the partition 28 and to the first heat transfer elements 14 of the heat exchanging unit 10. More particularly the first fan causes the first fluid F1 to flow in a first direction in the first section 22A of the chamber, which first direction is here from the first to the second opening 40 and 42 in the partition 28. It can therefore be seen that the evaporator channels and condenser channels of the conduits of the heat exchanging unit are provided in parallel with each other along the direction of flow of the first fluid. It can also be seen that the first side of the heat exchanging unit with the evaporator channels also faces the flow of the first fluid. When the first fluid F1 passes by the conduits, heat will then be picked up by the first heat transfer elements 14 and from there transferred to the working fluid in the evaporator channels. The working fluid then evaporates, rises in the conduits and thereafter enters the condenser channels, where heat of the working fluid is transferred to the ambient air via the second heat transfer elements 12. In this process ambient air is drawn through the fluid transporting passage 24 and therefore also through the heat exchanging unit 10 by the second fan 36 and then returned to outside the electric machine. The second fan thus causes the second fluid to flow in a second direction in the fluid transporting passage 24. This second direction is here opposite to the first direction. It can here also be seen that the second side of the heat exchanging unit 10 faces the flow of the second fluid F2. The second fan 36 thus causes the working fluid to condense and drop in the condenser channels and flow to the evaporation channels for closing the loop. Through passing the heat exchanging unit 10 in this way the air F1 in the chamber is cooled and then returned from the first section 22A to the second section 22B via the second opening 42 where it is again being heated by the stator and rotor. In this way the first fluid is circulated in the chamber and the electric machine is cooled.

As can be understood from FIGS. 1, 2 and 3, the first heat transfer element 14 is provided inside the chamber for transferring heat from the first fluid F1 to the working fluid in the conduit 11 via the evaporator channel 20 and the second heat transfer element 12 is provided in the fluid transporting passage 24 for transferring heat out of the working fluid in the conduit via the condenser channel 21 to the second fluid F2. It can also be understood that the first fluid propagating unit 38 is provided inside the chamber and configured to force the first fluid in the chamber to flow past the stator 30, rotor 32 and first heat transfer element 14 while the second fluid propagating unit 36 is provided in the fluid transporting passage 24 for forcing the second fluid F2 to flow past the second heat transfer element 12 of the heat exchanging unit 10.

In this way there is a first fluid flow in the chamber, a working fluid flow in the heat exchanging unit and a second fluid flow through the passage. The working fluid thus helps in transferring the heat from the first fluid in the chamber to the second fluid outside the chamber.

As was mentioned earlier, the heat exchanging unit 10 is fastened or fixed to the partition of the chamber that separates the two sections from each other. Since it also stretches the whole way from this partition 28 towards and through the wall 26 separating the chamber from the passage 24, further efficiency is obtained. In this way the hot air of the chamber has to pass by the heat exchanging unit and thereby a more efficient cooling takes place. Here it can also be mentioned that the second section of the chamber may be made from an original enclosure of the electric machine with the second section, heat exchanging unit, fluid transporting passage and second fluid propagating unit being provided as an add-on module mounted on the frame of this enclosure.

The invention provides a number of further advantages. It allows cooling of clean air in the chamber using possibly dirty ambient air. The use of a thermosyphon technology enables the use of optimized car industry technology, which in turn lowers the cost and raises the efficiency. The separation of fluid streams brings low pressure drop and low volume. This also provides the heat exchanger design with scalability since efficiency does not depend on size. The two-phase working fluid inside the heat exchanging unit transports the heat from the evaporating section to the condensing section by natural convection.

Since the pressure losses are low because of the used heat exchanging unit, the second fan can be an axial fan. Because of this also lower noise levels are obtained.

Since the first fan can use the movement of the rotor, further energy savings are enabled.

The electric machine can also be made compact since the heat exchanging unit is provided as a compact module. Because of this there is furthermore only one opening needed in the above-mentioned wall, which simplifies the sealing.

In a second embodiment of the invention this modular realization of the heat exchanging unit is used further.

Figure 4:
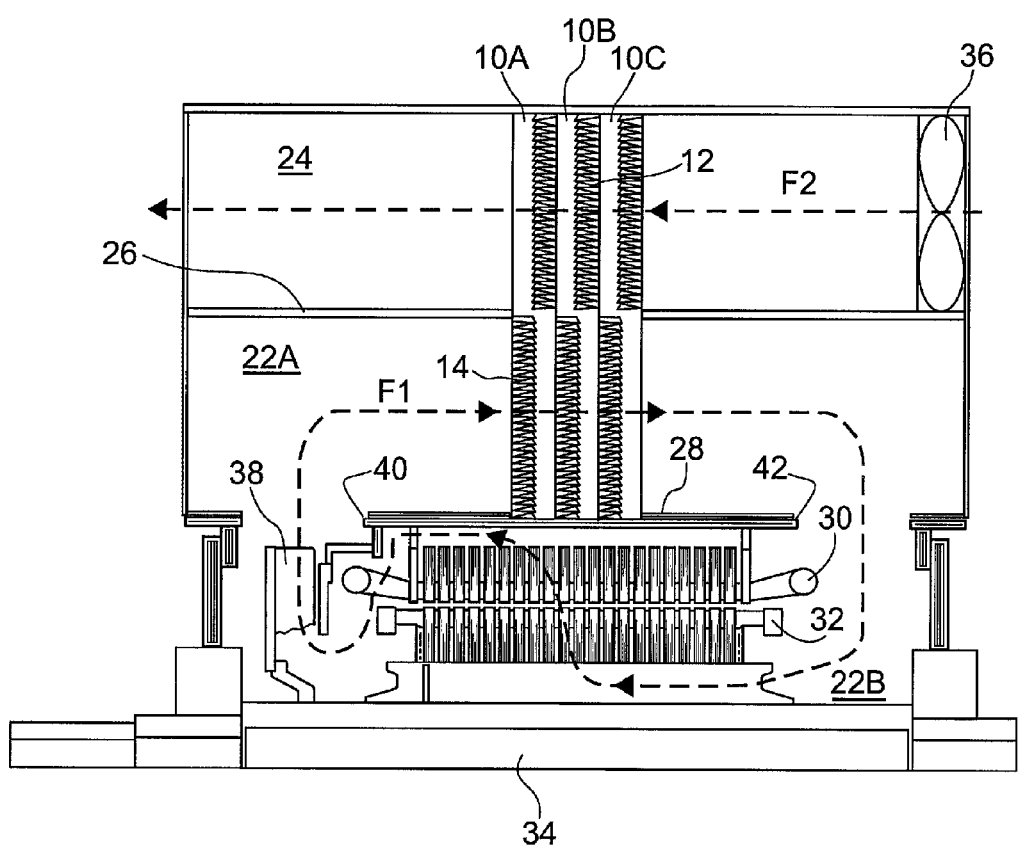
FIG. 4 shows a sectional view through a part of an electric machine according to a second embodiment of the invention.

This is exemplified in FIG. 4, which shows a sectional view through an electric machine that is similar to the machine in FIG. 3. The only difference here is the heat exchanging unit. In this case the heat exchanging unit is made up of a number of heat exchanging modules 10A, 10B, 10C, each module provided in the same way as the heat exchanging unit described in relation to FIGS. 1 and 2. These modules 10A, 10B, 10C are here stacked after each other in the first section 22A of the chamber, i.e. in a direction from the first opening 40 towards the second opening 42 of the partition 28. This also means that they are placed after each other in the direction of flow of the first fluid F1 in the first section 22A of the chamber. Each module furthermore has the same orientation as the heat exchanging unit of the first embodiment. Also here there is furthermore a single opening in the wall 26 for the whole heat exchanging unit. This also means that the first heat transfer elements 14 of the modules 10A, 10B, 10C are aligned with each other in the direction of flow of the first fluid F1, while the second heat transfer elements 12 of the modules 10A, 10B and 10C are aligned with each other in the direction of flow of the second fluid F2.

When stacking modules onto each other they may be fastened to each other in a number of ways. One module may therefore be provided with a first type of fastening element arranged to interact or mate with a second type of fastening element on a neighboring module. The fastening elements may here for instance be a screw and bolt, or snap in solutions such as a spring interacting with a recess.

This second embodiment of the invention has the further advantages in that individual heat exchanging modules can be stacked to meet various heat load requirements. This means that one heat exchanging module design can be used for several different sizes and types of electric machines. This increases economy and simplifies the provision of cooling, since it is possible to obtain the desired cooling effect merely through selecting the number of modules required.

Another possible variation concerns the type of cooling performed. In the first and second embodiments there is asymmetric cooling. However, it is as an alternative possible with symmetric cooling.

Figure 5:
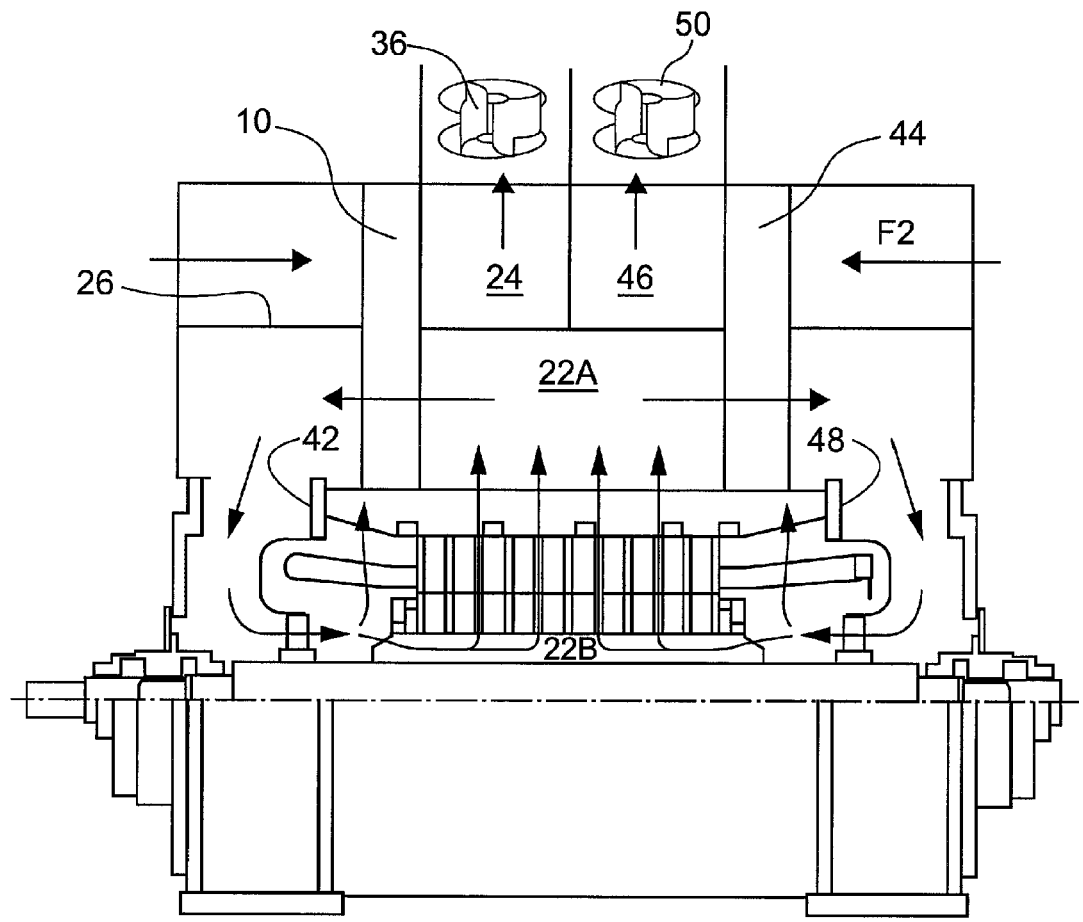
FIG. 5 shows a sectional view through a part of an electric machine according to a third embodiment of the invention.

FIG. 5 shows a sectional view through a part of an electric machine according to a third embodiment of the invention where symmetric cooling is used.

In case of symmetric cooling according to this third embodiment there is, in addition to a first heat exchanging unit 10, also a second heat exchanging unit 44. Furthermore apart from the first opening (not shown) and second opening 42, there is here a third opening 48 in the partition. In this embodiment the first opening is provided centrally in the partition and the first fan (not shown) placed for forcing the first fluid F1 into the first section 22A of the chamber via this first opening. Here the stator and rotor may be placed around this opening. The second and third opening 42 and 48 are then placed peripherally in the chamber and here on opposite sides of the first opening. The first heat exchanging unit 10 is then placed and fixed to the partition between the first opening and the second opening 42 in the first section 22A of the chamber, while the second heat exchanging unit 44 is placed and fixed to the partition between the first opening and the third opening 48 in the first section 22A of the chamber. In this way two flows, which may with advantage be opposite, can be provided in the chamber. In this case it is possible to use the same fluid transporting passage for both heat exchanging units. However, in this third embodiment each heat exchanging unit 10 and 44 is provided with its own fluid transporting passage 24 and 46 and also separate fans 36 and 50. In this embodiment the fans are furthermore centrifugal fans placed at the exit of the fluid transporting passages. Axial fans can here of course also be used. Here the heat exchanging units can be made up of one or several modules.

It is furthermore possible to add further openings and heat exchanging units to the chamber.

The present invention can be varied in a multitude of further ways. It should for instance be realized that the first fluid propagating unit may be a separate unit not connected to the rotor or the shaft. It is also possible to omit the distribution manifold. The evaporator channels and condenser channels may be provided in pairs, where each such pair forms a working fluid loop. It is also possible with only one such pair, which may then be provided in the same conduit. The direction of flow of the first and second fluids through the heat exchanging unit was above described as being provided in opposite directions. It should be realized that as an alternative they may be provided in parallel in the same direction through the heat exchanging unit as well as at other angles with respect to each other.

From the foregoing discussion it is evident that the present invention can be varied in a multitude of ways. It shall consequently be realized that the present invention is only to be limited by the following claims.

What is claimed is:

1. An electric machine comprising:
   a closed chamber with at least one wall and enclosing a stator, a rotor and a first fluid,
   a heat exchanging unit stretching from the chamber through said wall and to a fluid transporting passage outside the chamber, said heat exchanging unit comprising
   at least one conduit provided in a loop within the heat exchanging unit and comprising a working fluid, said conduit being provided with an evaporator channel and a condenser channel,
   a first heat transfer element inside the chamber in contact with the evaporator channel for transferring heat from the first fluid to the working fluid in said conduit via the evaporator channel, and
   a second heat transfer element in the fluid transporting passage in contact with the condenser channel for transferring heat out of the working fluid in said conduit via the condenser channel to a second fluid,
   a first fluid propagating unit provided inside the chamber and configured to force the first fluid in the chamber to flow past the stator, rotor and first heat transfer element, and a second fluid propagating unit provided in the fluid transporting passage for forcing the second fluid to flow past the second heat transfer element of the heat exchanging unit, wherein the heat exchanging unit is modular, where each module comprises at least one conduit with a working fluid provided in a loop, a first heat transfer element and a second heat transfer element, the modules being placed after each other in the direction of flow of the first fluid.

2. The electric machine according to claim 1, wherein the first fluid propagating unit is mechanically coupled to the rotor.

3. The electric machine according to claim 1, wherein the second heat transfer element has a placing on the conduit that is vertically above the first heat transfer element.

4. The electric machine according to claim 1, wherein the evaporator channel and condenser channel are separated by at least one longitudinal wall in the interior of the conduit.

5. The electric machine according to claim 1, wherein the evaporator channel and condenser channel of said conduit are provided in parallel with each other along the direction of flow of the first fluid.

6. The electric machine according to claim 5, wherein the evaporator channel is provided in an evaporating section of the unit, which evaporating section is provided at a first side of the heat exchanging unit that faces the flow of the first fluid.

7. The electric machine according to claim 6, wherein the condenser channel is provided in an evaporating section of the unit, which condenser section is provided at a second side of the heat exchanging unit that faces the flow of the second fluid.

8. The electric machine according to claim 7, wherein the second side is opposite the first side on the heat exchanging unit.

9. The electric machine according to claim 5, wherein the heat exchanging unit comprises a number of conduits placed in parallel with each other perpendicular to the direction of flow of the first fluid.

10. The electric machine according to claim 1, wherein the first heat transfer elements of the modules are aligned with each other in the direction of flow of the first fluid and the second heat transfer elements of the modules are aligned with each other in the direction of flow of the second fluid.

11. The electric machine according to claim 1, wherein the second fluid propagating unit is configured to draw the second fluid from outside the electric machine into the fluid transporting passage and return the second fluid outside the machine after passing second heat transfer elements.

12. The electric machine according to claim 1, wherein the second fluid propagating unit is an axial fan.

13. The electric machine according to claim 1, wherein the first fluid is circulated in the closed chamber.

14. The electric machine according to claim 1, wherein the first and second fluids are both air.

15. The electric machine according to claim 1, wherein the chamber comprises a first and a second section, where the stator and rotor are placed in the second section and the first heat transfer element of the heat exchanging unit is placed in the first section.

16. The electric machine according to claim 15, wherein the two sections are separated by a partition having a first opening and a second opening, wherein the heat exchanging unit is fixed to the partition between the openings.

17. The electric machine according to claim 1, comprising a further heat exchanging unit having the same configuration as said heat exchanging unit and stretching from the chamber through said wall to a fluid transporting passage outside the chamber, where the first fluid propagating unit is configured to force the first fluid in the chamber to flow past also the heat transfer element of the further heat exchanging unit, while a fluid propagating unit is provided in said fluid transporting passage for forcing second fluid to flow past the second heat transfer element of the further heat exchanging unit.

18. The electric machine according to claim 17, wherein the fluid transporting passage and fluid propagating unit associated with the further heat exchanging unit is a further fluid transporting passage and a third fluid propagating unit.

* * * * *